O. J. McGOWAN.
CHAIN.
APPLICATION FILED SEPT. 22, 1917.
1,280,507.
Patented Oct. 1, 1918.
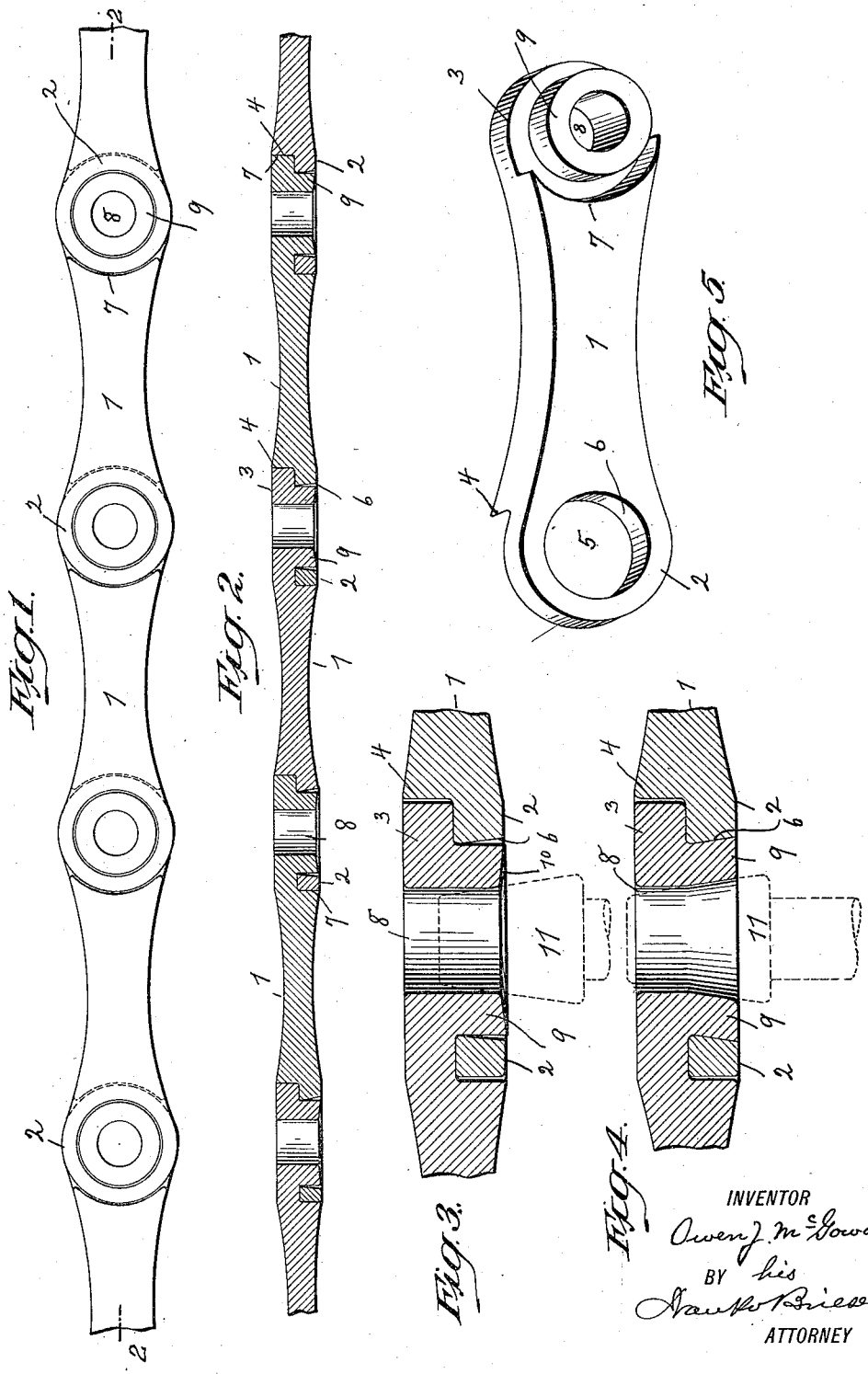

UNITED STATES PATENT OFFICE.

OWEN J. McGOWAN, OF BROOKLYN, NEW YORK.

CHAIN.

1,280,507.      Specification of Letters Patent.      Patented Oct. 1, 1918.

Application filed September 22, 1917. Serial No. 192,691.

*To all whom it may concern:*

Be it known that I, OWEN J. McGOWAN, a citizen of the United States, and a resident of Brooklyn, in the county of Kings and State of New York, have invented certain new and useful Improvements in Chains, of which the following is a specification.

This invention relates to a chain of novel construction, which is of superior strength, requires neither riveting nor welding and may be readily assembled.

In the accompanying drawing:

Figure 1 is a side view of a chain embodying my invention, showing the links assembled and prior to interlocking;

Fig. 2, a longitudinal section on line 2—2 Fig. 1;

Fig. 3, a longitudinal section through the joint prior to expansion;

Fig. 4, a similar section subsequent to expansion, and

Fig. 5, a perspective view of one of the links.

All the links 1 of the chain are of like construction, and are shown to consist of a flat bar having concaved longitudinal edges, though the link may be different contour if desired.

The thickness of the link is reduced at both of its ends, but on opposite faces, so as to form an eye or circular projection 2 on one end which is flush with one of said faces, and a similar eye or circular projection 3 on the other end, which is flush with the other face.

Back of eye 2, there is formed on link 1, a concave shoulder 4, which has the same radius as the eye, and is consequently concentric to the aperture 5 of the latter, said aperture having a beveled wall 6. In front of eye 3, there is formed a similar concave shoulder 7, which has the same radius as the eye, and is concentric to the aperture 8 of the latter, the two shoulders 4 and 7, being, by the construction described, formed on opposite faces of the link.

From eye 3, there extends forwardly, a tubular hub 9, the bore of which coincides with that of the latter. The hub is adapted to be snugly received within the aperture 5 of the adjoining link, the diameter of which is consequently considerably greater than that of aperture 8. The end of hub 9 should be slightly beveled toward its eye as indicated at 10 (Fig. 3.)

In assembling the parts, the eye 2 of one link is projected over the hub 9 of the adjoining link, (Figs. 1, 2 and 3) so that in this way the two eyes 2 and 3 of adjoining links will be placed into facewise contact, eye 2 engaging shoulder 7 of eye 3 while eye 3 engages shoulder 4 of eye 2. A tapering solid punch or similar tool 11 is now driven into hub 9, by means of which the latter will be expanded toward the tapering wall 6 of aperture 5 (Fig. 4) and thus become joined therewith in such a manner, that while the links will become permanently interlocked, they will have a free pivotal movement around the axis of hub 9. By the expanding movement described, the beveled end 10 of the hub will be so deflected that it will be brought into alinement with the face of the encompassing eye 2 thus producing a neat finish.

It will be seen that the chain constructed as described, is devoid of all pintles or solder joints and that the links may be assembled in a simple and reliable manner. Moreover, should the joints become unduly loose through wear, they may be readily tightened up, by a new application of the punch.

I claim:

1. A chain link having eyes on opposite ends, said eyes projecting from opposite faces of said link, and an expanded tubular hub extending from one of said eyes.

2. A chain link having eyes on opposite ends thereof, said eyes projecting from opposite faces of said link, shoulders concentric to said eyes, and an expanded tubular hub extending from one of said eyes.

3. A chain formed of a plurality of links, each link having an eye on each of its ends, one of said eyes having an expanded hub, while the other eye is beveled, the expanded hub of one link being adapted to interlock with the beveled eye of the adjoining link.

4. A chain formed of a plurality of links, each link having an eye on each of its ends, said eyes projecting from opposite faces of the link, and an expanded hub extending from one of said eyes, while the other eye is beveled, the beveled eye of any one link interlocking with the expanded hub of the adjoining link.

5. A chain formed of a plurality of links, each link having eyes on opposite ends thereof, said eyes projecting from opposite faces of said link, shoulders concentric to said eyes, an expanded hub extending from one of said eyes, while the other eye is beveled, the beveled eye of any one link being in facewise contact with the eye of the adjoining link, and interlocking with the expanded hub of said adjoining link.

6. A chain formed of a plurality of links, each link having an eye with a relatively large and beveled perforation at one end, and an eye with a relatively small perforation at the other end, said eyes extending from opposite faces of said link, shoulders concentric to said eyes, and an expanded hub extending from the eye having the relatively smaller perforation, the eyes of adjoining links being in facewise contact while the beveled perforation of any one link is engaged by the expanded hub of the adjoining link.

OWEN J. McGOWAN.

Copies of this patent may be obtained for five cents each, by addressing the "Commissioner of Patents, Washington, D. C."